F. G. GALE.
INCANDESCENT WELDING WITH ELECTRICITY.
APPLICATION FILED MAR. 29, 1916. RENEWED APR. 16, 1919.

1,323,178. Patented Nov. 25, 1919.

Inventor.
Francis G. Gale
by Heard Smith & Tennant
Attys.

UNITED STATES PATENT OFFICE.

FRANCIS G. GALE, OF WATERVILLE, QUEBEC, CANADA.

INCANDESCENT WELDING WITH ELECTRICITY.

1,323,178. Specification of Letters Patent. Patented Nov. 25, 1919.

Application filed March 29, 1916, Serial No. 87,501. Renewed April 16, 1919. Serial No. 290,637.

*To all whom it may concern:*

Be it known that I, FRANCIS G. GALE, a subject of the King of Great Britain, residing at Waterville, Province of Quebec, Dominion of Canada, have invented an Improvement in Incandescent Welding with Electricity, of which the following description, in connection with the accompanying drawing, is a specification, like characters on the drawing representing like parts.

This invention relates to incandescent welding with electricity and has for its object to provide a novel method of incandescent welding with electricity by which two articles having different cross-sectional area can be readily welded together without the necessity of pre-heating the article of larger cross-sectional area. Although my improved process is adapted for use in welding together articles of any shape or configuration, it has special advantages when used in welding the end of one tube to the side of another tube, especially where the first-named tube is of smaller size and thinner gage than the latter tube.

In the manufacture of various articles, it is often necessary to secure the end of a smaller tube to the side of a larger tube, and under many circumstances, it is an advantage if the two tubes can be welded together, thus making them practically an integral structure. As an illustration of a structure in which the end of a smaller tube is connected to the side of a larger tube, I would refer to a metal bedstead having tubular posts, tubular top and bottom cross rails connecting the posts, and vertically-extending tubular filling pieces connecting the top and bottom rails. The filling pieces are usually smaller in size and of lesser gage than the top and bottom rails and the top and bottom rails are of smaller size and of lesser gage than the posts.

The above reference to a bedstead is merely for illustrative purposes, however, as my invention is capable of use in welding together different articles for a great variety of structures.

It is quite difficult to weld the end of a tube to the side of another tube by the known processes of incandescent welding by electricity especially when the first-named tube is smaller and of thinner gage than the other tube. In incandescent welding with electricity the heat is produced by the resistance which the articles to be welded offer to the electric current.

There are two methods commonly used in incandescent welding with electricity. One is to bring the two articles to be welded into contact and then to send the working current from one article to the other through the joint between said articles thereby heating the contacting portions of the articles to welding heat. This method is satisfactory where the two articles have the same cross-sectional area or have the same electrical resistance because in such case the contacting portions of the two articles are heated to the same degree and are brought to a welding temperature simultaneously. This process of welding is done on what is termed a single transformer welding machine. Another method of incandescent welding by electricity which is sometimes used when one of the articles to be welded has a greater cross-sectional area or less resistance than the other article is to pre-heat the article of larger cross-sectional area or less resistance before the two articles are brought into contact and the current is sent from one to the other article at the place to be welded. When the two articles are brought into contact and the welding current is sent from one to the other, the article of smaller cross-sectional area and greater resistance will heat more rapidly than the other article, and the object of pre-heating said other article is to raise said article at the point where the weld is to be made to a sufficient temperature so that when the two articles are brought together, they will come to a welding temperature simultaneously. In order to pre-heat one of the articles, it is necessary to use what is described in the trade as a double transformer welding machine, said machine being so constructed that one transformer is used to develop the pre-heating current, while the other transformer is used for developing the welding current. The welding of the end of a smaller tube of thinner gage to the side of a larger tube of thicker gage presents the problem of welding together two articles, one of which has a lesser cross-sectional area and greater resistance than the other article, and a weld of this nature cannot be successfully made according to the first-mentioned method because if the tubes to be welded are brought into contact and the current is turned on, the smaller tube having the smaller cross-sectional area will become over-heating will occur not at the very ex- brought to a welding temperature, and the over-heating will occur not at the very extremity of the smaller tube where it engages the side of the larger tube, but at a little distance back from the extremity.

I have provided herein an improved method of incandescent welding by electricity by which the end of a relatively-small tube of relatively-thin gage can be welded to the side of a larger tube of thicker gage without the necessity of pre-heating the larger tube and by means of a single transformer welding machine.

In carrying out my improved method, I bring the end of the smaller tube closely adjacent the side of the larger tube where the weld is to be made and then apply the electric current to the two tubes, and at the same time hold the end of the smaller tube in such a position relative to the side of the larger tube that a sparking contact will result. The application of the electric current will, of course, cause the two tubes to become heated and because of the smaller cross-sectional area and higher resistance of the smaller tube, it will become heated more rapidly than the side of the larger tube which, of course, has a less resistance because of its greater cross-sectional area. As the temperature at the end of the smaller tube increases, the resistance is correspondingly increased according to well-known electrical laws, and the end of the smaller tube will, therefore, be brought to a melting heat before the side of the larger tube has been brought to a welding temperature. During this operation a sparking contact is maintained between the end of the smaller tube and the side of the larger tube. By thus maintaining a sparking contact, the point of greatest resistance is at the very extremity of the smaller tube, and said tube will, therefore, be hottest at its extremity, the heat at this point being sufficient to melt or burn away the end of the smaller tube. The side of the larger tube is thus subjected not only to the heat developed by the electric current due to the resistance of the material of the larger tube, but also to the excess heat developed in the end of the smaller tube. This excess heat developed in the end of the smaller tube assists the heat due to the electrical resistance of the larger tube in bringing the latter to a welding temperature. When the side of the larger tube has been brought to welding temperature, the current is shut off and the two tubes are pressed together firmly thereby making the desired weld. During the heating operation and before the welding pressure is applied, the end of the smaller tube is burned away to a greater or less extent, but the amount of material which is thus lost is insignificant compared with the time saved in making the weld without any pre-heating operation.

In order to give an understanding of my invention, I have illustrated in the drawings some of the steps of the process and some of the articles made thereby.

In the drawings, Figure 1 is a view of a bedstead made in accordance with my invention;

Fig. 4 is a plan view showing the two square tubes of Fig. 1 in position to present the sparking contact above referred to;

My improved process is adapted for use generally wherever two articles are to be welded together.

Figure 2:
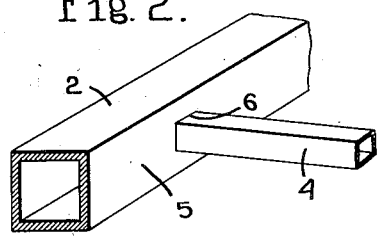
Fig. 2 is a perspective detail view of a welded joint made in accordance with my invention showing the end of a relatively-small square tube welded to the side of a relatively-large square tube.
Figure 3:
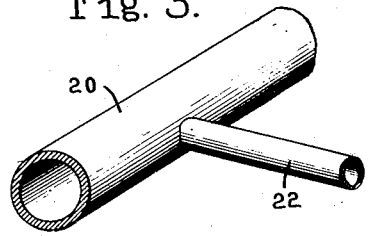
Fig. 3 is a similar view showing the end of a relatively-small round tube welded to the side of a relatively-large round tube.
Figure 4:
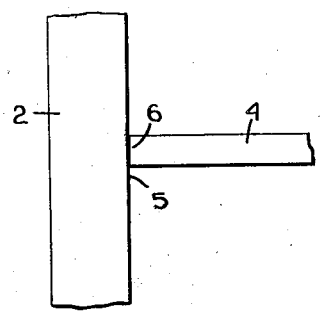
Figure 5:
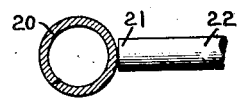
Fig. 5 shows the similar position of the round tubes in Fig. 3.

In Figs. 2 and 4 of the drawings I have illustrated a small square tube 4, the end 6 of which is to be welded to the side 5 of a larger square tube 2, and in Figs. 3 and 5 I have shown a smaller round tube 22, the end of which is to be welded to the side of a larger round tube 20. These tubes 4 and 2 and 22 and 20 may be parts of any structure.

Figure 1:
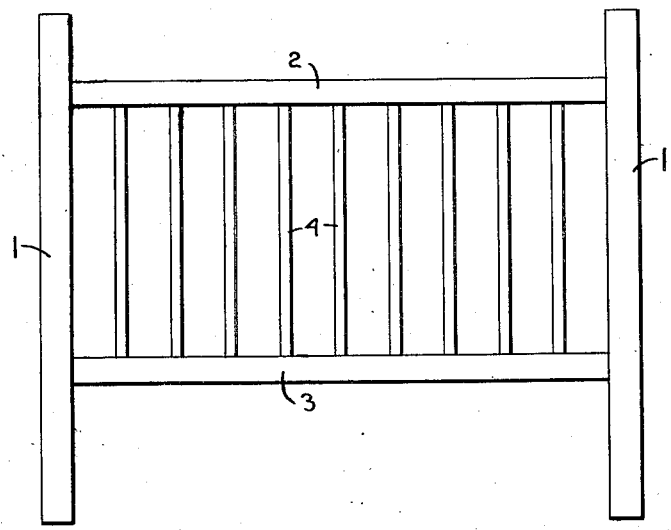

Fig. 1 shows a bedstead of which the tubes may form a part. This bedstead comprises posts 1 which are connected by top and bottom rails 2 and 3, and it also comprises vertical filling members 4 extending between the top and bottom rails, the posts, top and bottom rails and filling members all being tubular in shape.

When the end 6 of a smaller tube, such as the tube 4, is brought against the side 5 of a larger tube, such as the tube 2 in Fig. 2, and a current is sent from one tube to the other, the smaller tube 4 will present a greater resistance to the current than the side of the larger tube 2 owing to the smaller cross-sectional area of the tube 4. As a result, the tube 4 will become heated much faster than the portion of the side of the tube 2 with which the tube 4 contacts, and because of this fact, it has not been possible to successfully make a weld of this character on a single transformer machine. My present invention, however, provides an improved method by which the end of a small tube 4 can be successfully welded to the side 5 of a larger tube 2. In carrying out my invention I place the end 6 of the tube 4 adjacent the side 5 of the tube 2 where the weld is to be made and then connect said tubes in the circuit carrying the welding current.

The tube 4 is then adjusted toward the tube 2 until a sparking contact is provided. The current which is used in incandescent welding by electricity has a relatively-small voltage but high amperage, and in order to produce a sparking contact, the end 6 of the tube 4 must be almost in contact with the side 5 of the tube 2, although the tubes should not be pressed firmly together. This relative position of the parts is indicated in Fig. 4. The passage of the electric current through the tubes when they are held in this position will cause the end 6 of the tube 4 to heat much more rapidly than the side 5 of the tube 6 because of the greater resistance of the tube 4 and of the fact that the resistance of this tube increases as the temperature increases. The resistance of the tube 4 at the end 6 thereof is, therefore, not only initially higher than that of the side 5 of the tube 2, but this resistance increases more rapidly than that of the side 5 of the tube 2. As a result, the end 6 of the tube 4 will be rapidly brought to a melting or burning temperature and because the sparking contact is maintained, the point of greatest resistance in the tube 4 will be at the extremity thereof and thus the point of highest temperature will be at the extremity. The temperature at the extremity of the tube 4 is thus considerably above welding temperature. In fact, the temperature at this point is such as to cause the tube to melt or burn away. The excess heat thus generated at the end of the tube 4 assists the action of the electric current in heating the side 5 of the tube 2 so that the side 5 is brought to a welding temperature partly by the action of the electric current and partly by the excess heat developed in the end 6 of the tube 4. When the side 5 of the tube 2 has been brought to welding temperature, the current is shut off and the tubes 4 and 2 are pressed firmly together with sufficient pressure to make a proper weld. During the time that the tube 4 is subjected to the action of the electric current and the sparking contact between the two tubes is maintained, a certain portion of the end 6 of the tube 4 will melt or burn away, and as this occurs, the tube 4 is gradually moved toward the tube 2 so as to maintain the proper sparking contact.

The above-described process is applicable not only to welding the filling tubes 4 to the top and bottom rails 2 and 3, but is also applicable for welding the ends of the top and bottom rails directly to the sides of the posts 1.

I have referred above to the welding of the end of a square tube to the side of another square tube. The same process can be successfully used in welding the end of a round tube to the side of another round tube, as shown in Figs. 3 and 5, wherein 20 indicates a relatively-large round tube to the side of which the end 21 of a smaller round tube 22 is to be welded. In making this weld, the two tubes are brought into such relationship as shown in Fig. 5 as to provide the sparking contact between the end 21 of the tube 22 and the side of the tube 20 and the current is then turned on. The end 21 of the tube 22 becomes hot much more rapidly than the side of the tube 20 and said end 21 will quickly reach a melting or burning temperature. The side of the tube 20 becomes heated partly by the action of the electric current and partly by the excess heat in the end 21 of the smaller tube 22, as above described. In making a weld of this character, it is not necessary to shape the end 21 of the smaller tube to fit the larger tube before the weld is made because as soon as the end 21 has reached the melting temperature and begins to burn away, it will automatically shape itself to fit the side of the tube 20, and when the side of the tube 20 has been brought to welding heat then the weld can be effected by forcing the two tubes together.

The invention is equally applicable for welding together tubes of other cross-sectional shapes than the round and square tubes illustrated. A bedstead made in this way is a practically integral structure and the welds are so formed as to be invisible when the bedstead is completed.

Although I have referred specifically to a bedstead made of tubular elements welded together, yet I wish to state that since the invention relates to a process of welding, it is not confined to the manufacture of any particular article, but is adapted for use generally where articles are to be welded together.

I claim:

1. The process of welding the end of one tube to the side of another tube by incandescent welding with electricity which consists in placing the end of the first-named tube adjacent the side of the other tube, passing an electric current from one tube to the other and at the same time holding said tubes in such relative position as to provide a sparking contact between said tubes whereby the end of the first-named tube is brought to a melting or burning temperature before the side of the other tube is brought to welding temperature, utilizing the excess heat in the tube end for assisting the action of the electric current in raising the temperature of the side of said other tube to the welding point and when the side of said other tube has reached the welding point, pressing the two tubes together to effect the weld.

2. The process of welding the end of one tube to the side of another tube by incandescent welding with electricity which consists in placing the end of the first-named tube adjacent the side of the other tube, passing an electric current from one tube to the other in such a way as to bring the end of the first-named tube to a melting or burning temperature before the side of the other tube is brought to welding temperature, utilizing the excess heat in the tube end for assisting the action of the electric current in raising the temperature of the side of said other tube to welding point and then pressing the tubes together thereby to effect the weld.

In testimony whereof I have signed my name to this specification.

FRANCIS G. GALE.